US012121494B2

(12) United States Patent
Luong et al.

(10) Patent No.: US 12,121,494 B2
(45) Date of Patent: Oct. 22, 2024

(54) PEDICURE CHAIR ASSEMBLY WITH BASIN FOR STEAM BATH AND HEATING

(71) Applicant: CL Capital Investements Group LLC, Westminster, CA (US)

(72) Inventors: Christopher L. Luong, Westminster, CA (US); Quang Nguyen, Irvine, CA (US); Long Luong, Irvine, CA (US)

(73) Assignee: Lexor, Inc., Westminster, CA (US)

( * ) Notice: Subject to any disclaimer, the term of this patent is extended or adjusted under 35 U.S.C. 154(b) by 548 days.

(21) Appl. No.: 17/021,758

(22) Filed: Sep. 15, 2020

(65) Prior Publication Data

US 2021/0077346 A1 Mar. 18, 2021

Related U.S. Application Data

(60) Provisional application No. 62/901,197, filed on Sep. 16, 2019.

(51) Int. Cl.
*A61H 33/06* (2006.01)
*A47C 1/04* (2006.01)
*A61H 35/00* (2006.01)

(52) U.S. Cl.
CPC ............. *A61H 33/065* (2013.01); *A47C 1/04* (2013.01); *A61H 35/006* (2013.01); *A61H 2033/068* (2013.01); *A61H 2203/0431* (2013.01); *A61H 2205/12* (2013.01)

(58) Field of Classification Search
CPC ................ A61H 33/065; A61H 35/006; A61H 2033/068; A61H 2203/0431; A61H 2205/12; A61H 33/06; A47C 1/04
USPC ............................................ 4/622, 524, 655
See application file for complete search history.

(56) References Cited

U.S. PATENT DOCUMENTS 568,303 A * 9/1896 Hammer ................ A61H 33/06 4/531
626,373 A * 6/1899 Finzel .................... A61H 33/06 4/527
1,754,971 A * 4/1930 Waigand ................ A61H 35/00 604/23
3,119,122 A * 1/1964 Weisbeck ............... A47K 3/001 4/534

(Continued)

FOREIGN PATENT DOCUMENTS

WO WO-2010098641 A2 * 9/2010 ........... A61H 33/065

OTHER PUBLICATIONS

WO-2010098641-A2 Machine Translation (Year: 2024).*

*Primary Examiner* — David P Angwin
*Assistant Examiner* — William R Klotz
(74) *Attorney, Agent, or Firm* — Alumen IP Law PC

(57) ABSTRACT

A pedicure chair with a basin for receiving a quantity of water therein. An autofill system can be incorporated with the basin to automatically manage spillover. The auto fill system can have a controller, a water supply valve, and a water level sensor. The water level sensor can be a proximity sensor attached externally of the basin. The water level sensor can send a signal to a controller when the water level sensor detects a predetermined water level in the basin. The controller is configured to shut off the water supply to the basin by sending a signal to actuate the water supply valve. A steamer can be used with the pedicure chair to provide heat and a therapeutic steam bath.

29 Claims, 9 Drawing Sheets

(56) References Cited

U.S. PATENT DOCUMENTS

| | | | | | |
|---|---|---|---|---|---|
| 3,890,656 | A * | 6/1975 | Mathis | F04D 35/00 | 138/40 |
| 5,784,728 | A * | 7/1998 | Weddendorf | A47K 3/122 | 4/579 |
| 5,915,849 | A * | 6/1999 | Dongo | A61H 33/027 | 4/492 |
| 6,745,412 | B1 * | 6/2004 | Egeresi | A61H 33/10 | 4/537 |
| 6,755,398 | B1 * | 6/2004 | Wong | A61H 33/063 | 261/DIG. 65 |
| 7,367,067 | B2 * | 5/2008 | Watanabe | A61H 35/006 | 4/622 |
| 8,256,040 | B2 * | 9/2012 | Park | A61H 35/006 | 510/130 |
| 2004/0060108 | A1 * | 4/2004 | Hoon Park | A61H 35/006 | 4/622 |
| 2006/0026753 | A1 * | 2/2006 | Leung | A47K 3/022 | 4/622 |
| 2011/0004994 | A1 * | 1/2011 | Le | A61H 35/006 | 4/541.1 |
| 2011/0094026 | A1 * | 4/2011 | Ton | A61H 35/006 | 4/541.6 |
| 2012/0246820 | A1 * | 10/2012 | Huynh | A61H 35/006 | 4/524 |
| 2014/0059759 | A1 * | 3/2014 | DuHack | A61H 33/6078 | 4/494 |
| 2015/0218784 | A1 * | 8/2015 | Mazz | E03C 1/055 | 4/597 |
| 2019/0104891 | A1 * | 4/2019 | Tran | A61H 33/005 | |
| 2020/0345579 | A1 * | 11/2020 | Luong | A61H 35/006 | |
| 2021/0346236 | A1 * | 11/2021 | Zhou | A61H 33/065 | |

* cited by examiner

PEDICURE CHAIR ASSEMBLY WITH BASIN FOR STEAM BATH AND HEATING

FIELD OF ART

The present disclosure is directed to apparatuses and methods for a pedicure chair assembly with a foot basin and more particularly to controls and mechanisms for providing pedicure therapies within the foot basin of the chair assembly

BACKGROUND

Pedicure therapy can include placing a patient's foot within a basin of liquid, such as moving warm or heated water within a hot tub or a jacuzzi. Some pedicure therapists seek to replicate this therapy by placing a basin in front of a chair filled with water. However, the water in such basins are static and do not move. While pedicure chairs could include a pipe system to introduce water into and out of the chair's basin, providing some modicum of moving water within the basin, such chairs are expensive to build and maintain, as they have more moving parts with moving liquids within them, than standard chairs. As such, building and maintenance of such chairs can be expensive and cumbersome.

Thus, there is a need for improved pedicure basins to provide pedicure therapies to a seated patient.

SUMMARY

Aspects of the invention include a pedicure chair assembly comprising a seat having a seating surface; a basin located, elevation-wise, below the seat, wherein the basin comprises a cavity; a steamer that pushes steam through a steamer outlet; and a steam distributor located within a cavity of the basin, where the steamer comprises a first distributor outlet and a distributor inlet, where the distributor inlet is in fluid connection with the steamer outlet, and where the steam distributor distributes steam from the distributor inlet to the first distributor outlet into the cavity of the basin.

The steam distributor can comprise a second distributor outlet on an opposing side of the distributor.

The first distributor outlet can comprise a threaded cap that reduces a size of the outlet when the threaded cap is tightened.

A foot rest could also be placed above the steam distributor, having at least a portion (e.g. the portion where a foot rests) that is located, elevation-wise, above the steam distributor and below the seat.

The foot rest could can comprise a plurality of fluid passageways that allow steam from the first distributor outlet to flow from an interior cavity of the foot rest to an exterior surface of the foot rest.

The steamer can comprise a connection safety device that closes a valve in fluid connection between the distributor inlet and the steamer outlet when a steam hose is removed from the connection safety device.

A water outlet could pour water into the basin, preferably to cover the first distributor outlet with water.

A sheet with two leg holes could be used to cover an upper opening of the basin, and an elastic band that wraps around the sheet and the basin to hold the sheet in place against an exterior wall of the basin. A user could place their feet through the leg holes before coupling the elastic band around the sheet to hold the sheet in place above the user's feet as the steamer emits steam.

A steamer controller could be functionally coupled to a temperature sensor and the steamer, wherein the steamer controller deactivates the steamer when the temperature sensor detects a temperature above a threshold temperature.

Aspects of the invention further include a method of using a pedicure assembly, comprising: disposing a basin, elevation-wise, below a seat of a pedicure chair; disposing a steam distributor in a cavity of the basin; fluidly coupling a steamer with the steam distributor; and activating the steamer to push steam through the steam distributor to the cavity of the basin.

The method can include directing steam through a manifold of the steam distributor to distribute steam through at least two distributor outlets of the steam distributor.

The method can include directing steam through a circular egress of the steam distributor to distribute steam about the circular egress.

The method can include placing a foot rest above the steam distributor to heat a cavity below the foot rest.

The method can further include forming a plurality of fluid passageways about a perimeter of the foot rest to allow for steam from the steam distributor to flow from the cavity below the foot rest to the cavity of the basin. The method could also deactivate the steamer when a hose is removed from a connection safety device of the steamer.

The method could further include disposing water into the cavity of the basin. The water is preferably heated by the steam flowing through the water within the cavity of the basin. A temperature sensor could be placed in a location that the water touches when the water is disposed in the cavity of the basin, which could have data that is sent to a controller. The controller could detect a temperature of the water via the temperature sensor, and could then deactivate the steamer when the temperature sensor of the water detects a temperature above a predefined temperature threshold.

BRIEF DESCRIPTION OF THE DRAWINGS

These and other features and advantages of the present devices, systems, and methods will become appreciated as the same become better understood with reference to the specification, claims and appended drawings wherein:

DETAILED DESCRIPTION

The detailed description set forth below in connection with the appended drawings is intended as a description of the presently preferred embodiments of a pedicure chair apparatus with a basin provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
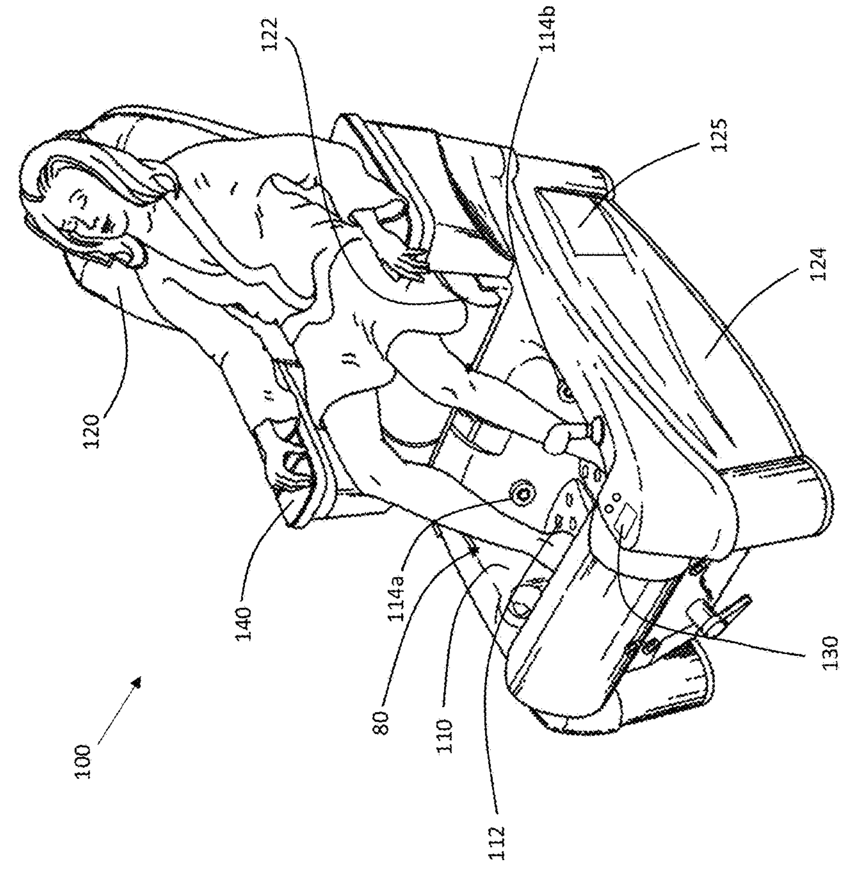
FIG. 1 shows a front perspective view of an exemplary pedicure chair assembly with a basin and control panels for controlling various functions associated with the chair.

Referring to FIG. 1, a pedicure chair assembly 100 comprises a basin 110 and a seat 120 having a seating surface 122 upon which a user can sit. The open end of the basin 110 is located below, elevation-wise, of the seating surface 122 of the pedicure chair 100. The basin 110 is sized and disposed to receive a quantity of water and a person's feet when the person is in a seated position in the pedicure chair 100.

In FIG. 1, the basin is unitarily formed with the chair cover or body 124, however in other embodiments the basin could be a separate component, such as a separately formed basin, that is placed in a frame or structure for supporting the separately formed basin in front of the seat 120. Preferably, the chair body 124 comprises a cavity that is sized and disposed to accept the separately formed basin 110, and comprises an attachment mechanism that holds the basin in place within the cavity, for example by using clamps, fasteners, a clasp, matching indents and detents, or an elastic band. In such embodiments, or in embodiments where the basin is placed in front of a chair, the chair body 124 and basin 110 could comprise different materials, similar to an opening of a counter-top for a sink. In such embodiments, the chair body 124 could comprise materials that are not waterproof while the basin 110 could comprise materials that are waterproof without damaging the non-waterproof portions of chair body 124. Basin 110 could be made of any suitable material, but is preferably made from a waterproof material, such as thermoplastic, ceramic, resin, or glass, and could be made to be opaque, translucent, or transparent material(s).

Figure 2:
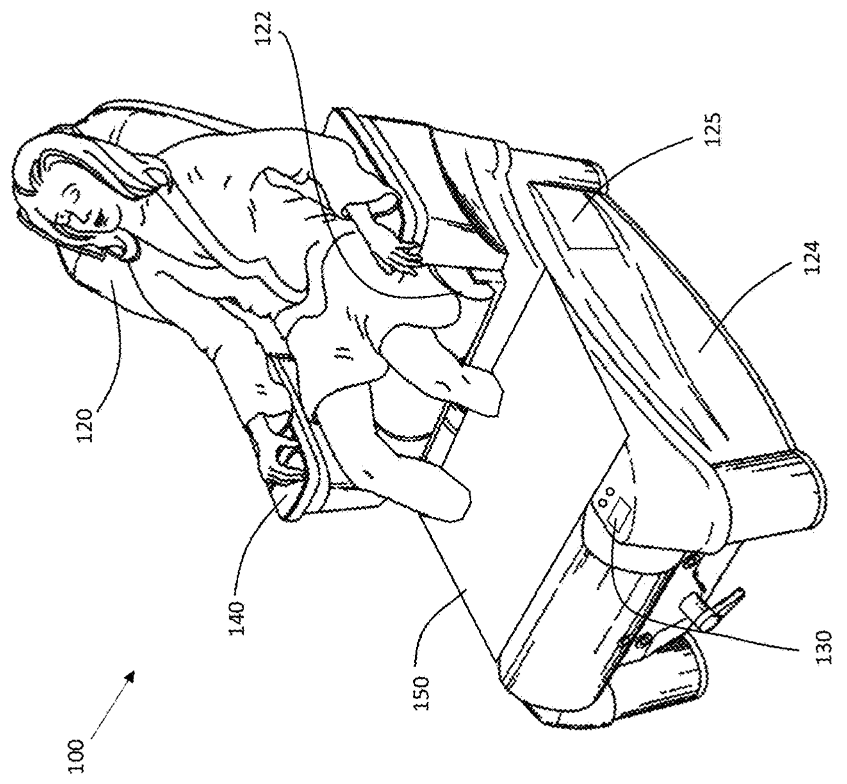
FIG. 2 shows a front perspective view of the pedicure chair assembly of FIG. 1 having a cover placed over the basin.

Basin 110 can be used with a footrest 112 upon which a human user can rest at least one foot, and preferably both feet when the footrest is incorporated. The footrest can be an elevated base that is integrally formed with the basin and elevated above the basin bottom, can be a separate structure having a footrest surface placed inside the basin, or a combination thereof. When used as a therapeutic steam bath for the feet, the basin 110 can comprise a steamer (not shown) that releases steam within the cavity or holding space 80 of basin 110, which could be used to provide steam therapy to the user's foot or feet. An optional cover 150, shown in FIG. 2, could be placed over the user's feet and around some or all of the opening of the basin 110 in order to retain steam within the cavity 80 of basin 110 for a period of time, which can be longer than when no cover is used. The cover 150 could be coupled to the basin using any suitable means, for example with buttons, a zipper, hoop and loop straps (VELCRO®), or by simply wrapping an elastic band around a base of basin 110 or chair body 124 to hold cover 150 in place. Cover 150 could be made of any suitable material, such as cloth, thermoplastic, or nylon, but is preferably made from a waterproof material or a disposable material for ease of use. In some embodiments, cover 150 could comprise a pair of holes or slits that a user could access to place their feet into the cavity of the basin, through the cover.

Basin 110 could be filled or partially filled with water, such as with a pitcher, a hose, or via water supply outlets 114*a* and 114*b* connected to a water supply source. In some embodiments, one or both outlets 114*a*, 114*b* can instead be pump covers for a jet pump or pumps to circulate water within the basin, after the basin has been filled by a hose, a pitcher, or a water supply line. Exemplary circulating jet pumps for a pedicure chair are described in U.S. Pat. No. 8,272,079, the contents of which are expressly incorporated herein by reference.

In embodiments where basin 110 has water in it, a steamer, which can include a housing having one or more steam outlets, can be provided in the basin 110 to heat the water to a threshold temperature or the steam could be used to circulate and move water within the cavity of basin 110. The one or more steam outlets should be submerged under water inside the basin so that steam is dispersed or mixed with the water during therapy treatment. One or more controllers, such as control panel 140 or control panel 130, could be used to interact with one or more controllers, such as a steamer controller and/or a water dispenser controller, to transmit instructions to a steamer and/or a water dispenser, as further discussed below. Control panel 130 and 140 could be configured to have similar user interfaces, different user interfaces, or could be configured to control non-overlapping functionality. For example, control panel 130 could be configured control a first set of functions and control panel 140 could be configured to control a second set of functions that are a subset of the first set of functions. This enables a technician or worker to control the water temperature and other parameters while a user of the chair controls a subset of functions. Control panel 130 could include different toggle switches or dial knobs, an on/off switch, and an emergency override, as non-limiting examples. In some embodiments, chair 120 could have only one control panel, such as only control panel 130 operated by a technician, or only control panel 140 operated by a user of the chair 120.

In some embodiments, a controller of a foot therapy system, such as a steamer controller or a water dispenser controller, could be a relay station that relays commands directly from a control panel, such as control panel 140, while in other embodiments the controller could be a computer system having its own processor and memory. As used herein, a "computer system" comprises any suitable combination of computing or computer devices, such as desktops, laptops, cellular phones, blades, servers, interfaces, systems, databases, agents, peers, engines, modules, or controllers, operating individually or collectively. Computer systems and servers may comprise at least a processor configured to execute software instructions stored on a tangible, non-transitory computer readable storage medium (e.g., hard drive, solid state drive, RAM, flash, ROM, etc.). The software instructions preferably configure the computer system and server to execute the functionality as disclosed. As used herein, a "unified gateway" comprises an improved routing device that dynamically bridges communication gaps between data transceivers that have differing transmission, security, and overhead restrictions and metrics.

In preferred embodiments, the controller comprises a simple computer system having a programmable EEPROM chip that saves simple instructions, for example an instruction to activate the steamer until a minimum temperature threshold is detected, upon which the chip transmits a command to deactivate the steamer, or a command to activate a water dispenser for a period of time, or until a threshold volume of water is reached within the cavity 80 of basin 110. One or more sensors could be functionally coupled to the controller to assist in executing such commands, such as a thermometer sensor (not shown) within the cavity 80 of basin 110 that transmits a detected temperature to the controller, or a water level sensor (not shown) within the cavity of basin 110 that transmits a notification to the controller when the sensor is submerged by water. The water sensor could comprise, for example, an electro-mechanical sensor having at least two prongs exposed to the cavity of basin 110 or projecting into the cavity of basin 110 to sense water level through contact with the water. Whether the level sensor is of a two-prong type or other types, such as a magnetic switch type, or a ball float type, direct contact between the water and a component of the level gauge is preferable. Other commercially available switches, control mechanisms, thermocouples, and sensors are contemplated and can be used with the pedicure chair assembly of the present invention, such as an on/off button and switches for controlling other functions incorporated with the chair, such as to controlling moving massage elements or turning on music.

Control panel 130 and/or 140 could also comprise a display that displays one or more parameters, such as measured water temperature, desired water temperature, elapsed time, total time, massage status, light status, steamer status, or other parameters. Such displays are preferably touch screen displays that display indicators that are selectable which the user can interact with.

Figure 3:
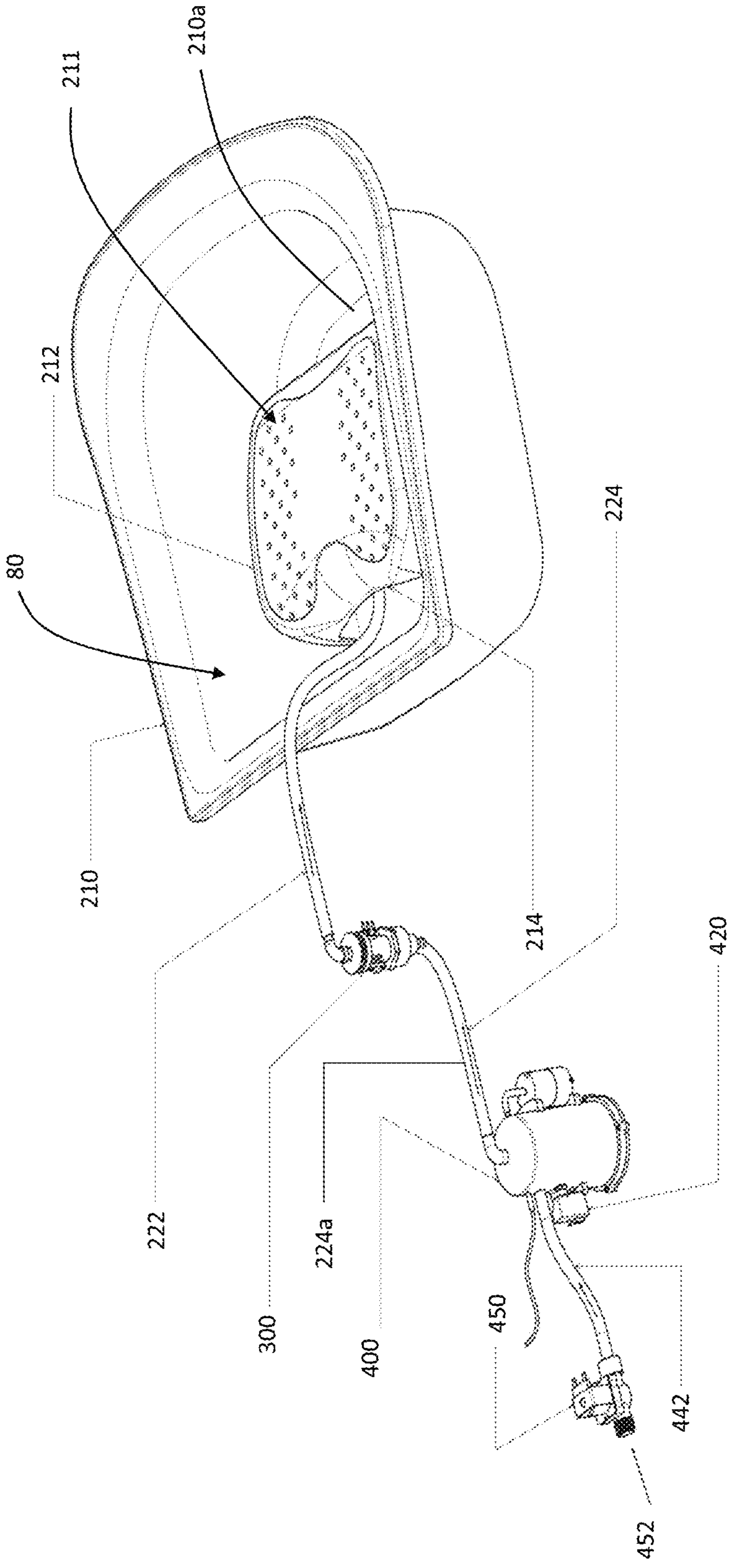
FIG. 3 shows a side perspective view of an exemplary basin assembly having a foot rest and a steamer that could be used to deliver steam to the basin.

FIGS. 3-6 show various views of a basin 210, foot rest 212, steam dispenser or distributor 214 (FIG. 6) and simplified steamer plumbing. FIG. 3 shows an exemplary basin 210 having a foot rest 212 with steam being released into basin 210 via steam dispenser box 214 located below the rest surface of the foot rest 212. Basin 210 is shown apart from the chair body 124 and the seat 120 (FIG. 1) for clarity. Also not shown, for clarity, are the water outlets mounted to or located on the sidewalls of the basin and the pump housing cover. Alternatively, the basin 210 can be separately formed for placement in a receiving area of a chair body. The cavity or holding space 80 of the basin 210 can be filled via one or more outlets that are connected to a water supply source or via a hose or a pitcher, or by removing basin 210 from a chair body, filling it within a sink, and then returning the basin 210 to a cavity within the chair body. In use, the basin is filled to a desired level, preferably higher than the outlets of the steam dispenser 214, before activating the steam dispenser.

Basin 210 has a cavity 80 within which a foot rest 212 and a steam dispenser or distributor 214 are located. The steam dispenser 214 emits steam into the cavity 80 from under the foot rest 212 to allow the cavity of basin 210 to fill with steam, or to intermix with the column of water located in the basin. When basin 210 has water in it, the steam could also act as a heating element to heat the water within the cavity of basin 210, and/or circulate the water to provide therapy to a user's foot or feet laying on foot rest 212.

Foot rest 212 can have a body or structure having a footrest surface 211 and one or more support legs or walls (219*a*, 219*b*, 219*c*, and 219*d* shown in FIG. 6) for elevating the footrest surface 211 above the basin floor 210*a*. Foot rest 212 is preferably separately formed and then placed into the basin so that foot rest 212 can move relative to basin 210. In some examples, the foot rest surface 211 can be partitioned or formed as sections for separately supporting the two feet, one foot on each footrest surface section. The footrest surface 211 can embody a generally rectangular surface with contoured perimeter edges or can take on different shapes, such as resembling two oversized feet (left foot and right foot), connected by a surface or spaced from one another. Projections or surface ornaments 213 can be incorporated for gripping or for acupressure. In an example, four spaced apart support legs 219*a*, 219*b*, 219*c*, and 219*d* can support and elevate the footrest surface 211 from the basin floor 210*a* or alternatively there can be two spaced apart elongated walls that support and elevate the footrest surface.

Foot rest 212 has a surface 211 sized and disposed to accept a user's foot or feet. Preferably surface 211 is inclined and is preferably sized and disposed to accept a single pair of feet, although non-inclined surfaces and/or surfaces sized and disposed to accept multiple feet are contemplated. Surface 211 is slightly inclined to allow a user to easily place their feet on surface 211 when the user is sitting in a seat that is not directly above foot rest 212. The surface of foot rest 211 has a plurality of textured surface projections 213 that can provide a therapeutic pressure to a foot that is resting on foot rest 211, as well as increase friction forces on a foot resting on foot rest 211.

Steam dispenser box 214 is placed within a lower cavity or space defined by foot rest 212 and the basin floor 210*a*. The foot rest 212 has legs 219*a*, 219*b*, 219*c*, and 219*d* with gaps or fluid passageways between the legs to enable steam and water mixing from the interior of the lower cavity of the basin to flow out the steam output spaces 82 (FIG. 5) between the legs of foot rest 212 to an exterior of the lower cavity of foot rest 212 in cavity 80. While foot rest 212 is shown as having fluid passageways shaped as archways between legs 219*a*, 219*b*, 219*c*, and 219*d* (FIG. 6), the fluid passageways could be sized and disposed in any suitable manner, such as one or more of windows formed in a wall around the lower cavity of foot rest 212, or one or more tubes formed in a wall around the lower cavity of foot rest 212.

A steam output space 82 is defined between the footrest surface 211, the basin floor 212*c*, and, in the present embodiment, between two adjacent legs. There can be one or more steam output spaces. Each steam output space 82 can be used as a working space for steam entering the basin or for mixed water and steam exiting from the lower chamber of the basin. Steam dispenser 214 can be placed underneath foot rest 212, allowing for steam to freely be released by steam dispenser box 214 without harming a user's foot placed in basin 210 on top of foot rest 212, as the released steam hits the underside of foot rest 212 within space 82 instead of the underside of the user's foot. Further, steam can mix with the body of water in the basin to reduce the possibility of direct steam contact with the user. In this manner, the steam can cool down before touching the user's foot or feet and steam vapor can rise above the liquid level, at a cooler temperature than normal steam temperature.

Thus, while the steam dispenser box 214 of the present invention can reach temperatures higher than a human foot can comfortably tolerate, the present system and the method using the system of the present invention can generate and dispense steam into the cavity 80 of basin 210 for use with a user. In an example, a user of the present device, system and method can set the steam exiting the steam dispenser box 214 to be slightly higher than a pain threshold of the user and allow the steam to cool down before touching an appendage of the user. As previously alluded to, the steam can blend or mix with the body of water inside the basin, which reduces the heat of the steam by increasing or heating the temperature of the water inside the basin. Steam can exit steam dispenser box 214 through the fluid passageways between the legs 219*a*, 219*b*, 219*c*, and 219*d*, heating the cavity of the basin 210 without directly hitting the user's feet after exiting dispenser box 214.

In some examples, the steam therapy can be carried out without immersing the steam dispenser box 214 with a column or body of water. Since the steam dispenser box 214 is located below the foot rest 212, any steam exiting the dispenser box 214 is separated from the user's foot or feet by the foot rest surface 211. Thus, by the time steam flows through the various fluid passages between the legs 219*a*, 219*b*, 219*c*, and 219*d*, the steam will have been cooled by conduction or convection with the cooler surrounding spaces and surfaces before the cooled steam contacts the user's foot or feet.

When basin 210 is void of any liquids, such as water, steam released by steam dispenser box 214 disperses out into basin 210 to bathe parts of the user that are located inside the basin, such as a hand or a foot. When basin 210 has a liquid, such as water, within the cavity of basin 210, steam released by steam dispenser box 214 disperses into the liquid, mixing and heating the liquid.

The steam is sent to the steam dispenser 214 from a steamer or steam generator 400 via the steamer outlet tubing or pipe 224, which can extend directly into the basin 210, into a steam output space 82, which can be one or more of the flow passages located between the legs, as previously discussed. The outlet tubing 224 can be a single silicone tubing length that extends from the steamer 400 directly into the steam output space 82 and having an end opening for steam discharge. In an example, a steam dispenser 214 is connected at an end of the outlet tubing 224 to disperse the steam. The steam dispenser 214 can be viewed as a disperser or a valve nozzle with multi-orifices or openings provided at the end of the outlet tubing 224 to disperse the steam in multi-directions as the steam exits the steam dispenser 214, as further discussed below with reference to FIG. 6.

In the embodiment shown, the steamer outlet pipe or tubing 224 can have a first section 224*a* and a second section 222 with a steamer connection safety device 300 located therebetween. Customary plumbing or hose connection fittings may be used to connect the various items together. In some embodiments, the various tubing sections can alternatively be metal, such as a copper, brass, or steel tubing or pipe.

The steamer connection safety device 300 may be used to control steam that is emitted by steamer 400, such as limiting steam throughput to a maximum threshold pressure and closing a steam valve (not shown) in the steamer connection safety device 300 if the steamer connection safety device detects a stop condition. For example, the steamer connection safety device 300 could detect if one of the steamer outlet tubing sections 224*a*, 222 are not plugged in, or could receive a stop command from a controller. Alternatively, a low flow or a no flow condition can be detected at the steamer connection safety device 300, which can then send a signal to the controller to power off the steamer 400.

Water flowing into the water inlet 452 of the valve may be sent to the steamer 400 via solenoid valve 450, which opens or closes a valve between pressurized water inlet 452 (FIG. 3) and an inlet tubing 442, or piping, depending on the control signal sent to the solenoid 450. When the solenoid valve is opened, water can flow into steamer 400 to provide input water to the steamer to heat and turn into steam. A water level sensor 420 is preferably configured to automatically transmit a signal when a water level of the steamer 400 rises above a threshold level, which could be transmitted directly to solenoid valve 450 to actuate the solenoid and turn off the valve, or could be transmitted to a controller which could then trigger a signal to the solenoid 450 to shut off the solenoid valve 450. In an example, the water level sensor 420 can detect a plurality of water levels, shutting off the solenoid valve 450 when the water level rises above a threshold level, and activating the solenoid valve 450 when the water level falls below the threshold level. Preferably signals from water level sensor 420 are transmitted to a controller, which could transmit a close command to the solenoid 450 in the conditions mentioned above, but could also transmit a close command to the solenoid valve 450 when a user transmits a "stop steaming" command to the controller, as an example.

In an alternative embodiment, the steamer 400 can be a batch steamer such that water, via a bucket or a pitcher, can be poured directly into a reservoir inside the steamer without an inlet line or without a constant water supply source. When the water level inside the alternative steamer 400 runs low, an alarm, such as a light or an audible signal, can be emitted to alert the user or technician to add more water into the steamer reservoir.

Figure 4:
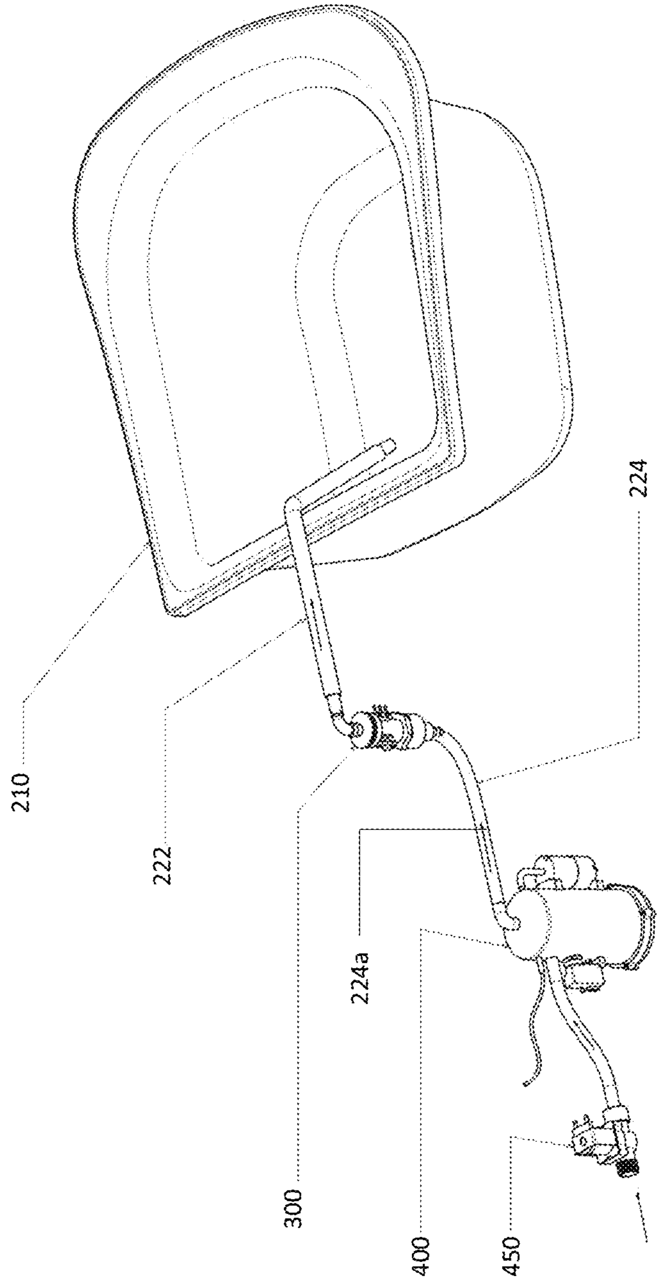
FIG. 4 shows a side perspective view of the basin of FIG. 3 without the foot rest, having a simplified steamer outlet.

An alternative perspective view of basin 210 is shown in FIG. 4, with the foot rest 212 and steam dispenser 214 (FIGS. 3, 5, and 6) removed. In this embodiment, steam could be transmitted directly into the cavity 80 of basin 210 through the tubing sections 224*a*, 222, and out an end opening of the second tubing section 222. Without a steam dispenser to direct the steam at the outlet of the second tubing section 222 inside the basin, steam can still effectively be used to treat a foot or the feet placed within basin 210, particularly in embodiments where the second tubing section 222 is moved from a central position of basin 210 to an edge position of basin 210, close to one of the basin sidewalls. Such a re-arrangement of the second tubing section 222 allows for the steam to circulate about an inner perimeter of the cavity 80 of basin 210 and not directly centrally of the basin where a user's feet may be positioned.

In some embodiments, inner features of basin 210 could be sized and shaped to direct steam to flow in a designated path, such as in a circular path, about the inner perimeter of the cavity of basin 210. For example, by shaping a recess in the shape of a half of a cylinder about the inner perimeter of the cavity 80 of basin 210 steam can be directed through the half-cylinder to avoid direct impingement on the user's feet. In other words, the interior 80 of the basin 210 may be provided with baffles or dividers to direct steam flow from the steamer adjacent or proximate the basin inner perimeter and away from a central position of the basin where a user's feet may be positioned. Any suitable features could be added to basin 210 to provide a flow path that helps to direct steam that is sent to basin 210 via the outlet tubing 224. For example, a PVC or a plastic distribution header with an array of holes drilled through the walls of the PVC or plastic tubing may be lined along sections of the cavity 80, adjacent or proximate the upstanding sidewalls of the basin 210. The tubing 224 may be directed into such a distribution header where steam can flow out the array of holes drilled through the distribution header. The drilled holes can aim towards the upstanding sidewalls and away from a user's feet. However, using a foot rest 212 is generally preferable over using the basin without a foot rest.

Figure 6:
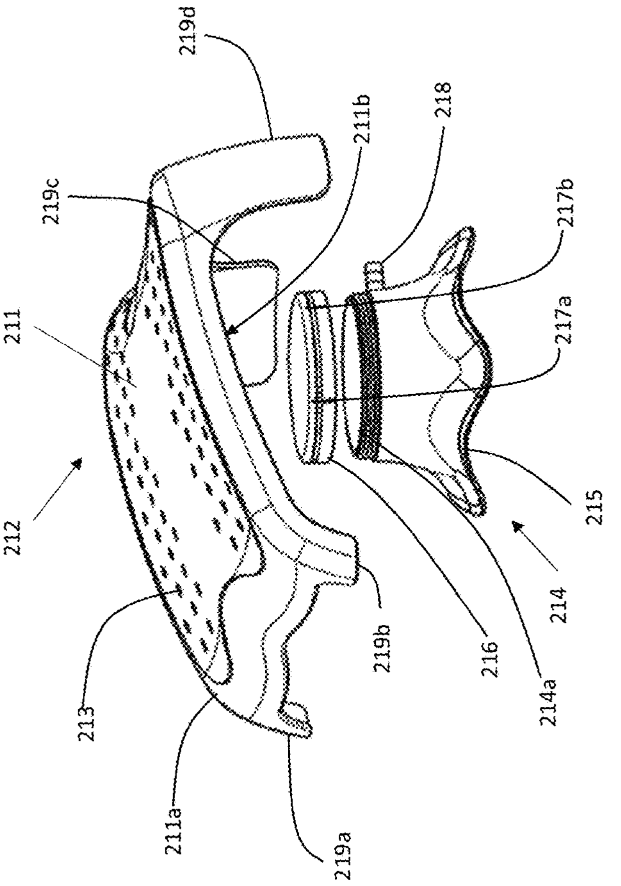
FIG. 6 shows a side perspective exploded view of the foot rest and steam distributor of FIG. 5, with a manifold detached from the steam distributor.
Figure 5:
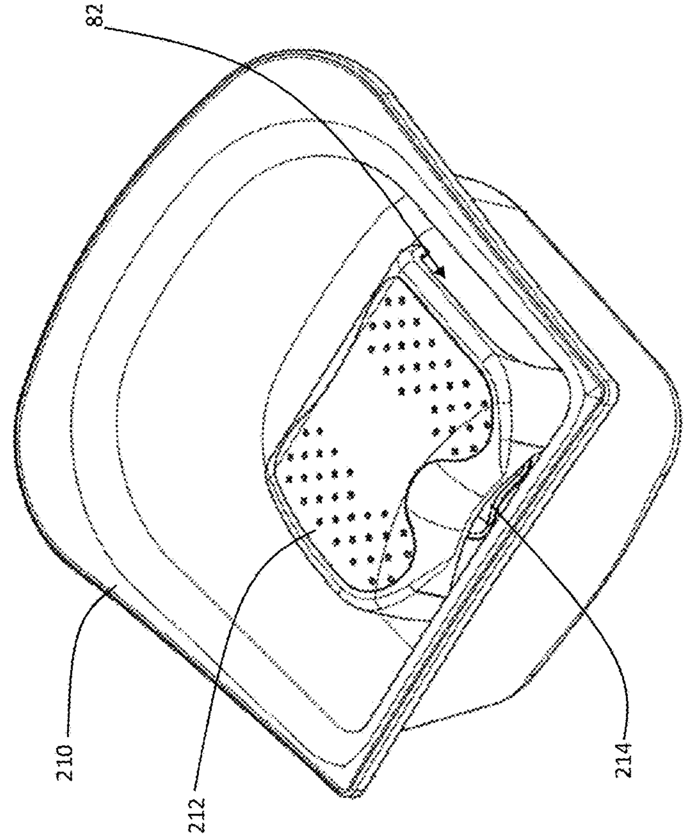
FIG. 5 shows a top perspective view of the basin of FIG. 3 having a foot rest and a steam distributor.

A zoomed-in view of basin 210 is shown in FIG. 5, showing foot rest 212 and part of the steam dispenser 214. FIG. 6 depicts an exploded view of the foot rest 212 and the steam dispenser 214 without the basin 210. In an exemplary embodiment, the steam dispenser 214 comprises a manifold 216 and a dispenser body 215. The manifold 216 is shown detached from the dispenser body 215, which can be connected via corresponding male and female threads with the use of interference, bayonet style, or snap fitting contemplated. In an example, the manifold 216 resembles a cap having internal threads.

Foot rest 212 has an upper surface 211*a* and an opposing bottom surface 211*b*. The upper surface 211*a* can be angled or sloped to allow for a user to place their feet on the foot rest 212 at a certain posture or orientation when sitting in a chair. Here, upper surface 211*a* has an approximate 30-degree incline, although other angles, such as greater than or less than 30 degrees, could be used, or a horizontal surface could be used, in alternative embodiments. A portion of the upper surface 211*a* preferably has one or more projections 213 that could help to increase friction forces on the foot, and/or to provide for therapeutic pressure on an underside of a user's foot when the user places a foot on the upper surface 211*a* of the foot rest surface 212.

As previously discussed, foot rest 212 can have a plurality of support legs or walls 219*a*, 219*b*, 219*c*, and 219*d*. In the embodiment shown, there are four spaced apart legs 219*a*-219*d* located generally extending downwards from the four-corners of the footrest surface 211. The far end of the footrest surface 211, furthest away from the user, can be supported by longer legs 219*c* and 219*d*, than the end of the footrest surface that is closer to the user, which is supported by shower legs 219*a* and 219*b*. The relative lengths of the legs can be selected to adjust the slope of the upper surface 211*a* and the spacing between the opposed lower surface and the basin floor when the foot rest 212 is placed into the basin.

Gaps or fluid passageways can be formed in between the legs 219*a*-219*d*. Utilizing individual legs with foot rest 212 to define fluid passageways therebetween allows for steam or water to billow out from the steam dispenser 214 through the gaps between the legs 219*a*, 219*b*, 219*c*, and 219*d*, such that the steam distributes in a plurality of directions underneath foot rest 212. Any suitable fluid passageways could be used to connect the steam output space 82 within the walls formed by legs 219*a*-219*d* and the space without the walls formed by legs 219*a*-219*d* within cavity 80. For example, foot rest 212 could be shaped like an upside-down basin having windows formed in the walls of the basin to allow steam to flow through a plurality of windows from the interior of the cavity underneath foot rest 212 to the exterior surface of foot rest 212. In alternative embodiments, foot rest 212 could comprise pipes that couple to a manifold of steam dispenser 214 to allow the system of the invention to direct steam through the pipes or tubes from the steam output space 82 underneath foot rest 212 to the exterior of foot rest 212.

Steam dispenser 214 comprises an inlet port 218, a manifold 216, and a plurality of outlet ports. While the embodiment of steam dispenser 214 shown in FIG. 6 shows a single inlet port and a plurality of outlet ports, any number of inlet ports and outlet ports are contemplated. Manifold 216 is shown with a plurality of outlet ports 217*a* and 217*b*, and preferably has at least four outlet ports—one for each cardinal direction of the fluid passageways between legs 219*a*-219*d* of foot rest 212. Manifold intake port 218 is configured to direct steam into manifold 216 and out of manifold outlet ports 217*a* and 217*b*. Manifold 216 couples to the lower body 215 of steam dispenser 214 via a threaded connection, which opens and closes outlet ports 217*a* and 217*b* as manifold 216 is loosened and tightened, respectively, onto the threaded connection. In the illustrated example, the manifold 216 comprises a round cap-like structure having central wall and a skirt depending therefrom. The outlet ports can be machined through the skirt. While manifold 216 is shown as a circular manifold where steam enters into a lower cavity of manifold 216 and exits out a plurality of outlet ports, two of which are shown as 217*a* and 217*b*, other shapes, sizes, and configurations are contemplated. For example, a manifold could be a circular manifold having a single circular outlet port about its perimeter, that opens and closes as the manifold is threaded about a lower body of a steam dispenser, while in other embodiments, a manifold could be a square manifold having curved outlet hoses about its perimeter, that is always in an opened state. In still other examples, there can be more than one outlet ports per cardinal direction.

In one embodiment, the outlet ports of the manifold 216, such as outlet port 217*a* and 217*b*, are fixed or not adjustable, such as not changeable in size to change the steam rate passing through them. In an alternative embodiment, the outlet ports are adjustable. For example, the size of the outlet ports can close or decrease the tighter a user tightens manifold 216 about the threads of the dispenser body 215 of the steam dispenser 214, and open or increase in size, to a maximum size, the looser the manifold 216 is disposed about the threads of the dispenser body 215. In an example, the outlet ports are located along a fixed elevated position on the manifold and threaded engagement or disengagement changes the relative spacing of the dispenser body 215 and the outlet ports on the manifold. This allows a user to provide manual control over the output of steam dispenser 214 without needing the use of an electronic controller. In an example, the upper edge 214*a* of the dispenser body 215 provides the closing mechanism for controlling the size of the outlet ports. Thus, as the manifold 216 tightens about the threads, the reach of the upper edge 214*a* of the dispenser body 215 approaches the underside surface of the central wall of the manifold, thus overlapping the skirt of the manifold 216 and closing in the openings at the skirt. When the manifold 216 tightens about the threads, the upper edge 214*a* of the dispenser body 215 seals against the underside of the central wall to completely or substantially close off the openings of the outlet ports 217*a*, 217*b*.

In other embodiments, more or less outlet ports could be formed, and in some preferred embodiments, manifold 216 could comprise a single outlet port formed along the outer perimeter of manifold 216 to direct omnidirectional steam in all directions about the outer perimeter of manifold 216. While manifold 216 and steam dispenser 214 are shown as substantially circular or cylindrically-shaped, steam dispenser 214 and/or manifold 216 could be formed in any suitable shape to direct steam about foot rest 212.

In another embodiment, the dispenser body 215 could be provided with a larger base or bottom than the upper end of the body, where the threads are provided. The relatively larger base provides stability and decreases the possibility of the dispenser body 215 tipping on its side during use. The intake port 218 can be provided at the side of the body, between the upper end and the bottom. The intake port 218 is in fluid communication with the interior cavity of the dispenser body 215, which has a bottom or floor to define an enclosed cavity with the sidewall of the dispenser body, with an open top to be enclosed by the manifold 216.

Steam is generated by heating water and transmitting the resultant steam to steam dispenser 214 via steamer outlet pipe or tubing 224. Water is preferably transmitted from water inlet 452 to steamer 400 via a solenoid 450 coupled to an inlet of water pipe 442 (FIG. 3). Solenoid 450 can be controlled by a controller (not shown) such as controller embedded in chair 100 or a controller coupled to an edge of basin 212. The controller could monitor a level of the water within the steamer pressure container of steamer 400 via water level sensor 420, closing solenoid 450 when the amount of water reported by water level sensor 420 rises above a set threshold, and opening solenoid 450 when the amount of water reported by water level sensor 420 falls below the same set threshold, or below a lower threshold. Steam generated by steamer 400 is then fed into steamer conductor pipe 224 to steamer pipe 222, which leads to steam dispenser 214 for dispersal of steam through basin 212. A steamer connection safety device 300 is preferably used to close a portion of the fluid passageway between steamer conductor pipe 224 to steamer pipe 222 in emergency situations, such as if steamer pipe 222 is disconnected, or if a detected pressure from steamer conductor pipe 224 rises above a set threshold.

Figure 8:
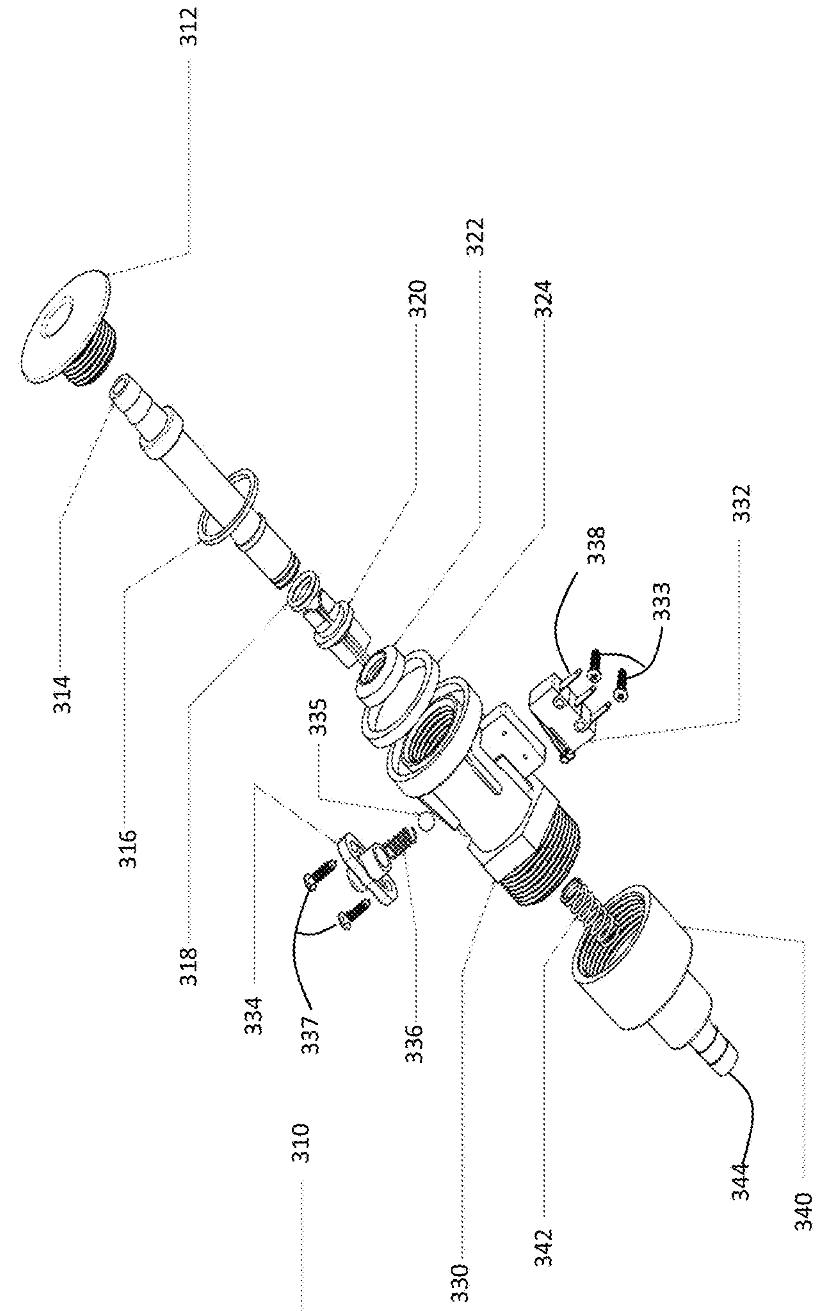
FIG. 8 shows an exploded perspective view of the steamer connection safety device of FIG. 7.
Figure 7:
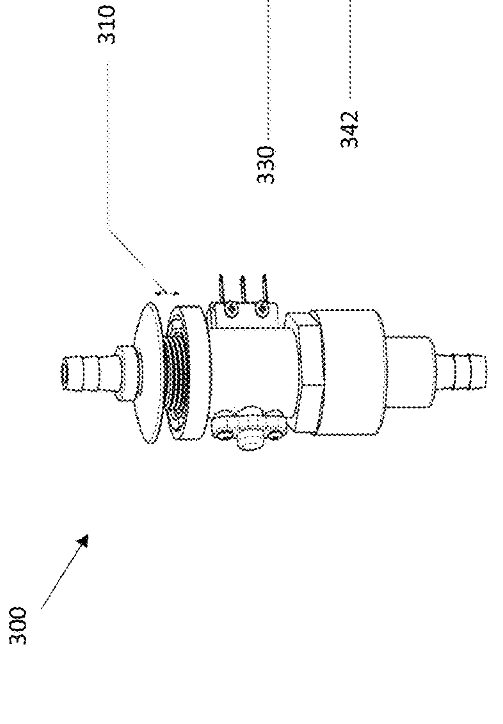
FIG. 7 shows a side perspective view of the steamer connection safety device of FIG. 3.

Close-up exploded views of steamer connection safety device 300 are shown in FIGS. 7 and 8, having a spa shell 310 enclosed by a top cap cover 312. Top cap cover 312 has a port through which steam rod 314 penetrates, allowing a pipe, such as steam conductor pipe 224, to be coupled to a top port of steam rod 314 to access a fluid passageway into the interior of spa shell 310. A cap cover gasket 316 helps to seal the interior of spa shell 310, while fitting rod gasket 318 helps to prevent steam from the fluid passageway within steam rod 314 from leaking through its connection with safety valve 320. Safety valve 320 mates with safety device housing 330 and safety valve gasket 322 and housing gasket 324 can be included for a more fluid tight seal. Bottom cap cover 340 seals the bottom ingress of safety device housing 330 via a threaded connection, which is kept taught via spring 342.

Steam enters steamer connection safety device 300 via ingress port 344 and exits steamer connection safety device 300 via the egress port of steam rod 314. A toggle switch 332 is mechanically connected to spring 336 and ball 335, which, when engaged, can manually open safety valve 320. Toggle switch 332 could be operated manually, via a user physically pushing toggle switch down towards bottom cap cover (which returns back to its original position via a spring force in safety valve spring 342), or could be operated via a controller electronically connected to toggle switch 332 via electronic connectors 338.

Steamer connection safety device 300 comprises a spa shell 310 held together via a plurality of threaded connections. In an example, the steamer connection safety device 300 comprises a top cap cover 312, a steam rod 314, a cap cover gasket 316, a fitting rod gasket 318, a safety valve 320, a safety valve gasket 322, and a housing gasket 324. The various components and gaskets can be secured in place inside the device housing 330 via a threaded connection between the upper threaded opening of the safety device housing 330 and the top cap cover 312.

Bottom cap cover 340 has its own inlet rod 344 and holds safety valve spring 342 in place inside the safety device housing 330 via a threaded connection between the lower threaded connection of the safety device housing 330 and the threads of the bottom cap cover 340. Toggle switch 332 is coupled to safety device housing 330 via one or more screws 333, while ball 335 and spring 336 are held in place via one or more threaded screws 337 for securing the retention plate 334 to the safety device housing 330. While threaded connections are shown as a preferred manner for holding various components of steamer connection safety device 300 together, any suitable manner of coupling mechanical devices together could be used, for example adhesives, clasps, elastic bands, detents, and snap-fit connections.

Figure 10:
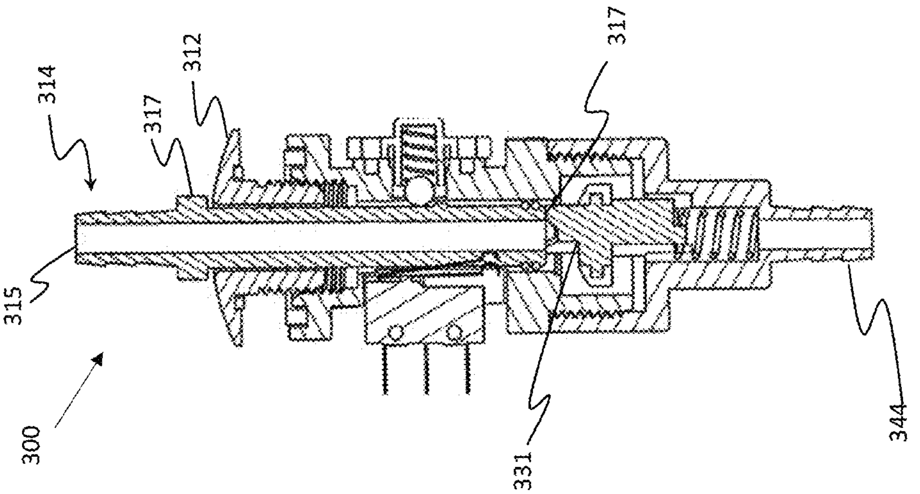
FIG. 10 shows a cross-sectional side view of the steamer connection device of FIG. 7 in the open valve position.
Figure 9:
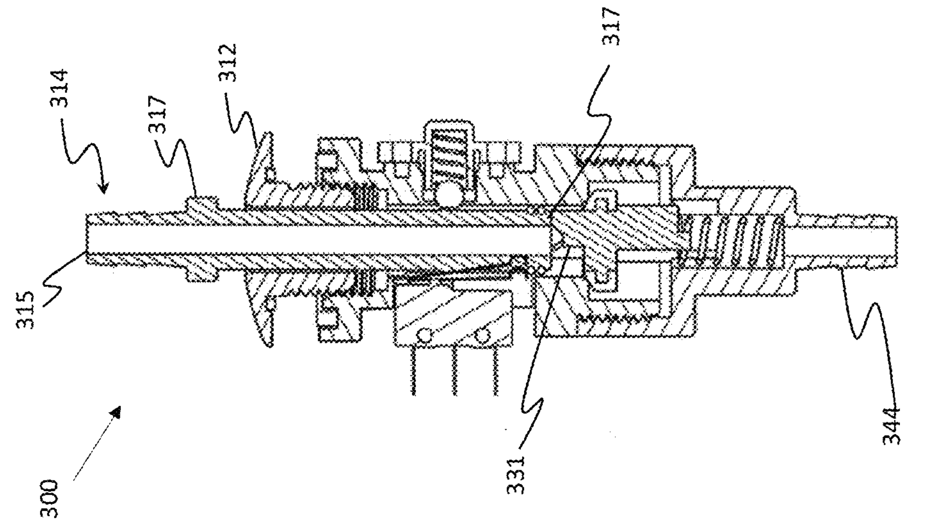
FIG. 9 shows a cross-sectional side view of the steamer connection device of FIG. 7 in the closed valve position.

An operation of steamer connection safety device 300 is shown in FIGS. 9 and 10, which shows cross-sectional views of steamer connection safety device 300 in a closed and open position, respectively. FIG. 9 shows steamer connection safety device 300 in a closed position. Steam rod 314 can have a pipe coupled to outlet 315. FIG. 9 shows how steam rod 314 is disposed when a pipe is not connected to outlet 315, while FIG. 10 shows how steam rod 314 is disposed when a pipe is connected to outlet 315. In FIG. 9, when a pipe is not connected to outlet 315, flange 317 does not abut the top surface of top cap 312, and the distal end of steam rod 314 does not provide a downward force onto valve 331. In such a configuration, valve 331 is closed, preventing steam from exiting outlet 315. In FIG. 10, when a pipe is connected to outlet 315, flange 317 abuts the top surface of top cap 312, and the distal end of steam rod 314 provides a downward force onto valve 331, opening valve 331 such that steam flows from inlet 344 to outlet 315. Such a configuration allows steamer connection safety device to prevent accidents when a pipe, such as steamer pipe 222, is not connected to outlet 315 of steam rod 314.

Figure 11:
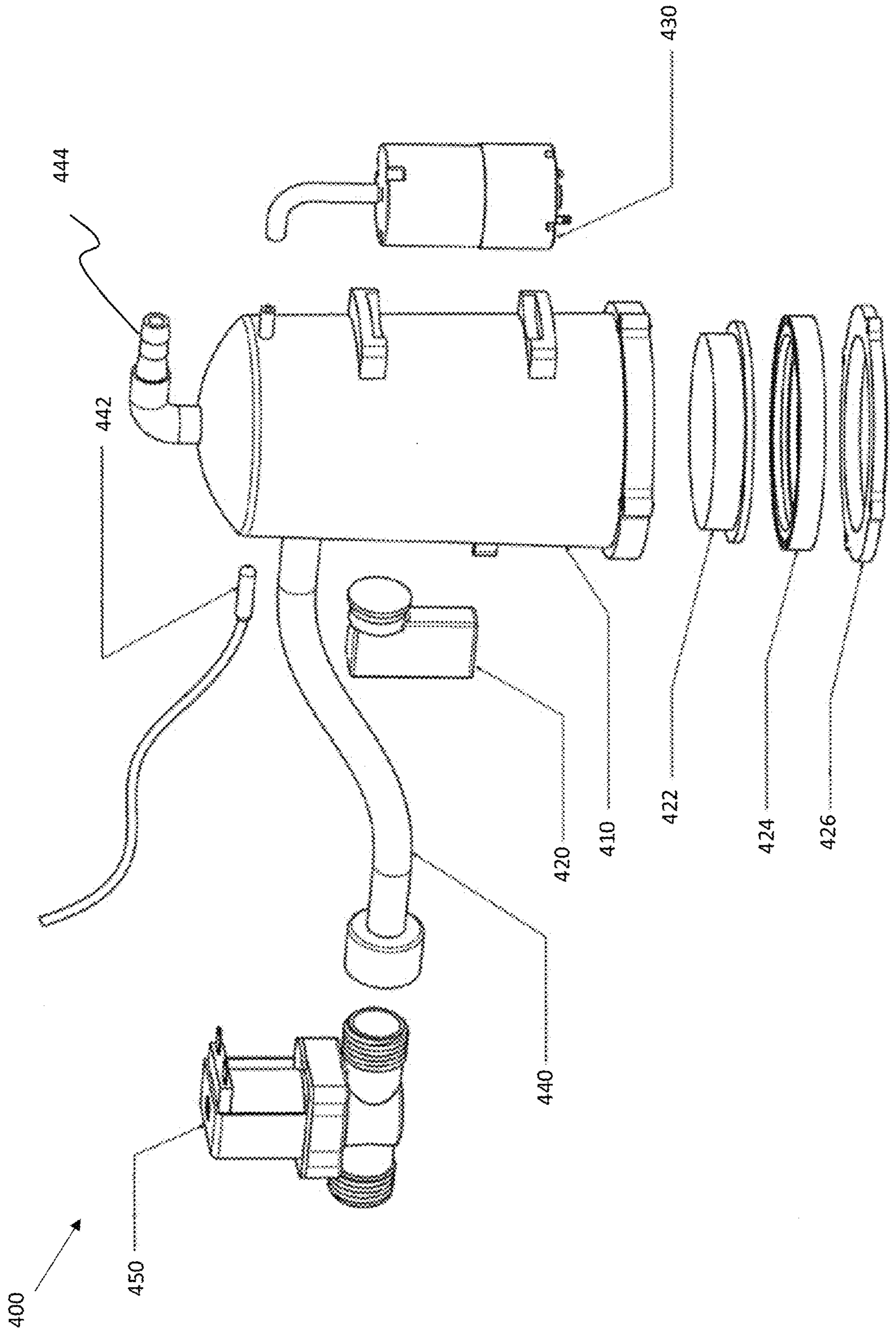
FIG. 11 shows an exploded view of the steamer of FIG. 3.

FIG. 11 shows an exploded view of steamer 400, having solenoid valve 450, which is understood to include a valve that can be actuated to open or close using a solenoid. The steamer further has temperature sensor 442, steam outlet 444, water hose 440, water level sensor 420, steamer container 410, resistor 422, gasket 424, ring base 426, and air pump 430. As discussed above, solenoid 450 is preferably coupled to a controller that is coupled to water level sensor 420, closing solenoid 450 when the water level sensor reports a water level above a threshold, and opening solenoid 450 when the water level sensor reports a water level below a threshold. Steamer container 410 comprises a container that receives water from water hose 440, and expels steam out steam outlet 444. Resistor 422 heats water within steamer container 410 above the boiling point of water to create steam. Resistor 422 is preferably coupled to a controller that is coupled to temperature sensor 442, which can be configured to activate resistor 422 to produce heat when temperature sensor 442 reports a temperature below a threshold, and deactivates resistor 422 to stop producing heat when temperature sensor 442 reports a temperature above a threshold. The resistor 422 and the current used to generate heat through the resistor can be sized to generate steam over a desired or acceptable span of time or duration to minimize taking too long of time. In some examples, hot water can be supplied to the steamer to speed up the steam generating time.

An optional air pump 430 could be used to pressurize air within steamer container 410 to ensure that a minimum threshold of steam is sent to a steam dispenser, such as steam dispenser 214. In some embodiments, air pump 430 could be coupled to a controller that is coupled to a pressure, PSI, sensor (not shown), which is configured to deactivate air pump 430 when the PSI sensor reports a PSI above a threshold, and activates air pump 430 when the PSI sensor reports a PSI below a threshold. Separate controllers could be used for each of solenoid 450, resistor 422, and air pump 430, or a single controller could be configured to control all devices of steamer 400.

Figure 13:
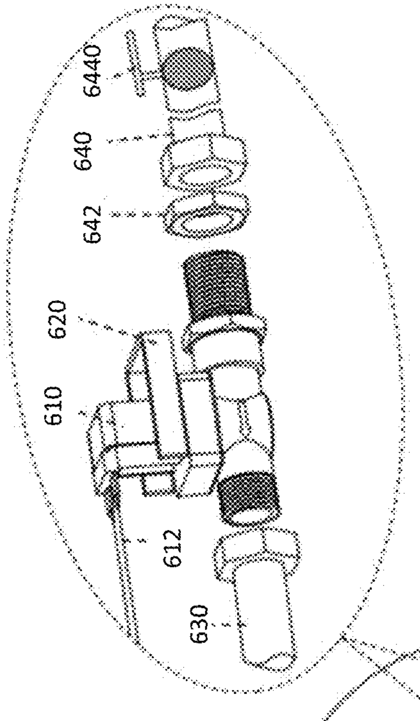
FIG. 13 shows a zoomed-in exploded view of a water output valve of the liquid autofill assembly of FIG. 12.
Figure 12:
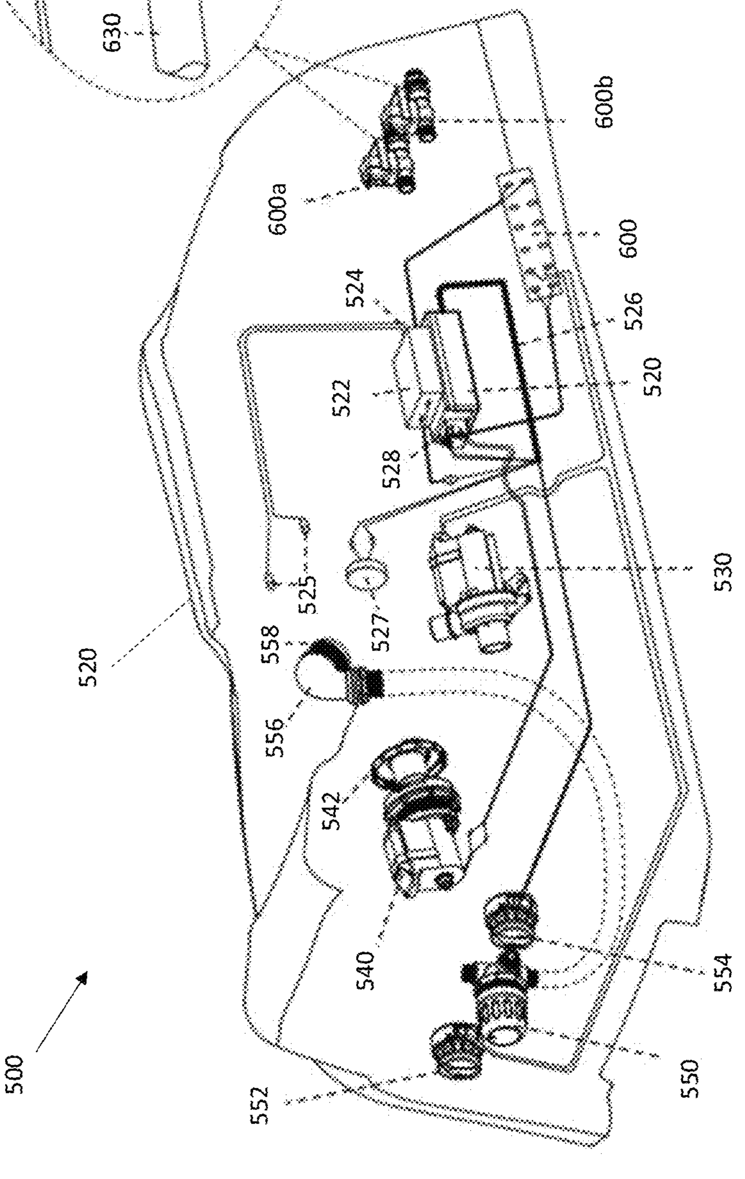
FIG. 12 shows an exemplary liquid autofill assembly for a basin.

FIG. 12 shows an exploded view of an exemplary drain pump 500 that could be used to automatically fill and drain an inventive basin, such as basin 212 of the present invention. A user could activate drain pump 500 by activating fill switch 554, which is electronically coupled to controller 520. Controller 520 can be programmed to open the hot and cold solenoids 610 when it receives a trigger from activating fill switch 554. Opening of the hot and cold solenoids 610 (FIG. 13) open the hot water tap 600*a* and cold water tap 600*b*, which are fluidly coupled to hot/cold mixer 550 via water pipes (not shown), which then fills the basin (not shown) via water spout 556. Once the water level reaches a threshold height, water sensors 525 installed on a side of the basin (not shown) would send a signal to controller 520 that the threshold water level has been reached. The controller could be programmed to respond in a plurality of manners, for example by closing hot and cold solenoids 610 by activating whirlpool jet 540, and/or by sending a wireless signal to open a steam valve, such as steamer connection safety device 300. When controller 520 receives a second trigger from fill switch 554, controller 520 could then transmit a signal to deactivate whirlpool jet 540. A drain switch 552 could be used to transmit a signal to controller 520, which would then execute a series of steps to drain the basin by opening a drain stopper and activating drain pump 530 to drain the basin after drain switch 552 has been triggered.

Figure 14:
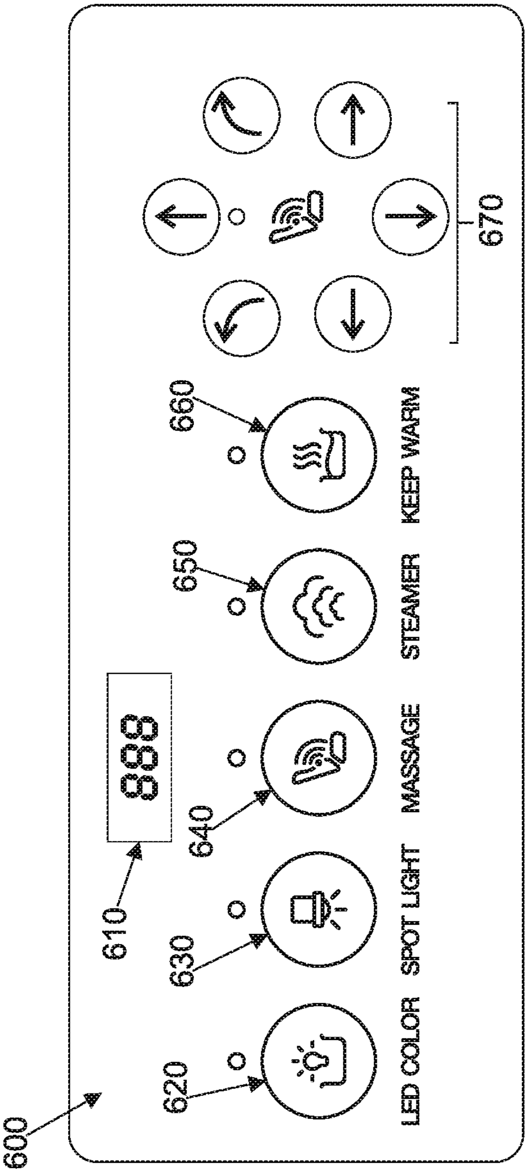
FIG. 14 shows an exemplary user interface for the chair of FIG. 1.

FIG. 14 shows an embodiment of a user interface 600 that could be used to transmit user-triggered signals to a controller. User interface 600 could be activated on any touch-screen device, such as control panel 130, control panel 140, or a handheld wireless device, such as a cell-phone with an installed application. Such a user interface could be used to transmit commands to a single controller that controls a plurality of mechanisms, such as chair movement motors of chair 100, massage motor mechanisms of chair 100, steamer 400 and/or steamer connection safety device 300, and one or more lights. For example, directional arrows 670 could be used to transmit signals to a controller to activate motors to move elements of seat 120 to a new location, such as a backing of seat 120 or seating surface 122 of seat 120. Massage activation button 640 could activate a massaging motor located within a massaging surface of seat 120. Spotlight button 630 could be used to activate a light located above seat 120, and LED color button 620 could be used to cycle through different colors of the activated light.

Steamer activation button 650 could be used to activate and deactivate a steamer, such as steamer 400, to release steam into a basin, such as basin 212. In preferred embodiments, the controller receiving the activation signal from activation button 650 is also coupled to solenoid 450 and connection safety device 300, which help to ensure that steamer 400 comprises an appropriate amount of water, and that an appropriate amount of steam is sent to steam dispenser 214. Keep warm button 660 could be used to moderate the activation of the steamer, such that when a controller receives a trigger from keep warm button 660, the controller allows steam to be sent to steam dispenser 214 when a detected temperature is below a set threshold, and prevents steam from being sent to steam dispenser 214 when the detected temperature is above a set threshold.

Display 610 could be used to transmit feedback signals to a user of user interface 600, for example when a user touches the steamer button 650, a signal "YES", "ON", or "STEAMING" could be sent to display 610 by the controller to indicate that the steaming process has started, or the controller could display a countdown of time to indicate how long the steamer will be activated. In some embodiments, the controller could respond to a trigger of the keep warm activation button 660 by displaying a set temperature that the controller is maintaining within the basin, such as basin 212.

Although limited embodiments have been specifically described and illustrated herein, many modifications and variations will be apparent to those skilled in the art. Accordingly, it is to be understood that the apparatus constructed according to principles of the disclosed devices, systems, and methods may be embodied other than as specifically described herein. The disclosure is also defined in the following claims.

What is claimed is:

1. A pedicure chair assembly, comprising:
- a seat having a seating surface;
- a chair body having a hollow space;
- a basin located, elevation-wise, below the seating surface in the hollow space, wherein the basin comprises wall surfaces that include a bottom surface defining a cavity;
- a pump outlet cover disposed on one of the wall surfaces to discharge water from a jet pump and circulate water within the basin;
- a steamer having a holding space for holding a quantity of liquid to be steamed to produce steam flowing out a steamer outlet; and
- a steam distributor located within the cavity of the basin, above the bottom surface;
  - wherein the steam distributor comprises a distributor outlet and a distributor inlet;
  - wherein the steam distributor is configured to distribute steam from the steamer out the distributor outlet and into the cavity of the basin;
- a connection safety device having a housing with an inlet, an outlet, and a movable valve and a spring located inside the housing for regulating steam flow; and
- wherein a first tubing section or a first pipe section connects the steamer outlet to the inlet of the connection safety device, and a second tubing section or a second pipe section connects the outlet of the connection safety device to the distributor inlet.

2. The pedicure chair assembly of claim 1, wherein the distributor outlet is located on a round manifold and a plurality of openings are formed on the round manifold.

3. The pedicure chair assembly of claim 2, wherein the inlet of the connection safety device has an elongated body located at a first end of the housing and the outlet of the connection safety device is located at a second end of the housing.

4. The pedicure chair assembly of claim 3, further comprising a foot rest having a foot rest surface located, elevation-wise, above the steam distributor and below the seating surface.

5. The pedicure chair assembly of claim 4, wherein the foot rest has spaced apart surfaces that surround the steam distributor, and wherein a plurality of fluid passageways are provided within the spaced apart surfaces for fluid flow thereacross.

6. The pedicure assembly of claim 3, wherein the outlet of the connection safety device has an elongated body.

7. The pedicure assembly of claim 6, wherein the elongated body of the inlet is aligned with the elongated body of the outlet along an axis.

8. The pedicure assembly of claim 3, further comprising a user interface comprising directional arrows and a steamer activation button.

9. The pedicure assembly of claim 3, further comprising a sheet having at least one hole or one slit connected to the basin and covering at least part of an upper opening of the basin.

10. The pedicure assembly of claim 3, wherein the connection safety device has a top cover comprising an opening, and wherein the outlet projects through the opening of the top cover.

11. The pedicure assembly of claim 3, further comprising a steamer controller functionally coupled to a temperature sensor and the steamer, wherein the steamer controller deactivates the steamer when the temperature sensor detects a temperature above a threshold temperature.

12. A method of using a pedicure chair assembly, comprising:

adding water to a basin located below, elevation-wise, a seat of a pedicure chair, the basin and the seat defining a lengthwise axis passing through a mid-section of both the basin and the seat;

placing a steam distributor comprising a steam inlet and a steam outlet in a cavity of the basin;

fluidly coupling a steamer, located externally of the basin, to an inlet of a connection safety device having a housing with a movable valve and a spring via a first tubing or a first pipe and fluidly coupling an outlet of the connection safety device to the steam inlet of the steam distributor via a second tubing or a second pipe, and placing the second tubing or the second pipe over an upper edge of the basin;

activating the steamer to push steam through the steam distributor and into the cavity of the basin; and wherein the seat is accessible, from a location external of the pedicure chair, from a first side of the lengthwise axis and a second side of the lengthwise axis.

13. The method of claim 12, wherein the steam outlet of the steam distributor is located on a round manifold and a plurality of openings are formed on the round manifold.

14. The method of claim 12, further comprising a solenoid valve located upstream of an inlet to the steamer and in fluid communication with the steamer.

15. The method of claim 12, further comprising placing a foot rest having a foot rest surface above the steam distributor.

16. The method of claim 12, further comprising circulating water in the basin with a water jet pump.

17. The method of claim 12, further comprising deactivating the steamer when the first tubing or the first pipe is removed from the connection safety device.

18. The method of claim 12, further comprising opening a solenoid valve to add water to the basin.

19. The method of claim 18, heating the water with steam emitted from the steam distributor.

20. The method of claim 19, further comprising detecting a temperature of the water via a temperature sensor.

21. The method of claim 20, further comprising deactivating the steamer when the temperature sensor of the water detects a temperature above a predefined temperature threshold.

22. The method of claim 12, further comprising circulating water inside the basin with a jet pump.

23. The method of claim 12, wherein the inlet of the connection safety device and the outlet of the connection safety device are aligned along an axis.

24. The method of claim 12, further comprising activating a solenoid valve to drain water from the basin.

25. A pedicure chair assembly, comprising:

a seat having a seating surface;

a chair body having a hollow space and a basin comprising wall surfaces that include a bottom surface defining a cavity;

a pump outlet cover disposed on one of the wall surfaces to discharge water from a jet pump and circulate water within the basin;

a steamer having a holding space for holding a quantity of liquid to be steamed to produce steam flowing out a steamer outlet; and a steam distributor located within the cavity of the basin and in fluid communication with the steamer, the steam distributor comprising a distributor inlet and a distributor outlet having a shape of a round manifold with a plurality of spaced apart openings formed on the round manifold;

a connection safety device in fluid communication with both the steamer and the steam distributor and located outside and spaced from both the basin and the steamer; and wherein the connection safety device comprising a valve for blocking and opening fluid communication between the steamer and the steam distributor.

26. The pedicure chair of claim 25, wherein the valve of the connection safety device is located in a housing and wherein an inlet to the housing is located at a first end of the housing and an outlet to the housing is located at a second end of the housing.

27. The pedicure chair of claim 26, wherein the inlet and the outlet of the connection safety device are aligned along an axis.

28. The pedicure chair of claim 27, further comprising a top cap cover connected to the housing and the outlet projects through an opening on the top cap cover.

29. The pedicure chair of claim 28, wherein the seat and the basin define a lengthwise axis passing through a mid-section of the seat and the basin, and wherein the seat is accessible, from a location external of the pedicure chair, from a first side of the lengthwise axis and a second side of the lengthwise axis.

* * * * *